United States Patent [19]

Fredericks

[11] 3,892,528

[45] July 1, 1975

[54] METHOD AND APPARATUS FOR VAPORIZING LIQUIDS TO BE CONTACTED WITH A CARRIER GAS

[75] Inventor: Alan D. Fredericks, College Station, Tex.

[73] Assignee: Oceanography International Corporation, College Station, Tex.

[22] Filed: Apr. 2, 1973

[21] Appl. No.: 346,905

[52] U.S. Cl......... 23/230 PC; 23/253 PC; 159/13 B; 159/13 C; 159/44; 159/47 R; 159/DIG. 1; 219/271; 219/275; 219/381
[51] Int. Cl. .......................................... G01n 31/12
[58] Field of Search............. 23/230 PC, 253 PC; 159/13 B, 13 C, 44, 47 R, 5, DIG. 1, 46; 219/271, 272, 273, 274, 275, 381, 552, 553

[56] References Cited
UNITED STATES PATENTS

| | | | |
|---|---|---|---|
| 2,689,477 | 9/1954 | Hornfeck | 73/190 R |
| 2,866,065 | 12/1958 | Hirsh | 219/272 X |
| 3,057,692 | 10/1962 | Van Kirk et al. | 23/230 PC |
| 3,168,377 | 2/1965 | Williams, Jr. | 23/230 PC |
| 3,345,271 | 10/1967 | Shay et al. | 159/46 |
| 3,506,803 | 4/1970 | Hart | 219/271 X |
| 3,538,305 | 11/1970 | Grant | 219/275 X |
| 3,574,549 | 4/1971 | Eggersten | 23/230 PC |
| 3,716,334 | 2/1973 | Pont | 23/230 PC |
| 3,725,005 | 4/1973 | Innes | 23/253 PC X |
| 3,734,693 | 5/1973 | Petcoff | 23/253 PC |

*Primary Examiner*—Joseph Scovronek
*Attorney, Agent, or Firm*—Richards, Harris & Medlock

[57] ABSTRACT

Disclosed is an improvement in a method of and apparatus for vaporizing a liquid to permit reaction of chemical substances in the vaporized liquid with a carrier gas. The liquid containing the chemical substances is discharged onto a current conductive filament wound in the form of a cylinder which retains the liquid therewithin by capillary action. A voltage is impressed across the filament to vaporize the liquid and any volatile chemical substances contained therein. The vaporized liquid, volatilized chemical substances and carrier gas are then passed over a second current conductive filament to promote reaction between the chemical substances and the carrier gas. The temperature of the first filament may then be elevated by increasing the voltage supplied across the first filament to permit reaction between the carrier gas and nonvolatile chemical substances remaining on the filament after vaporization of the liquid and volatile chemical substances.

3 Claims, 8 Drawing Figures

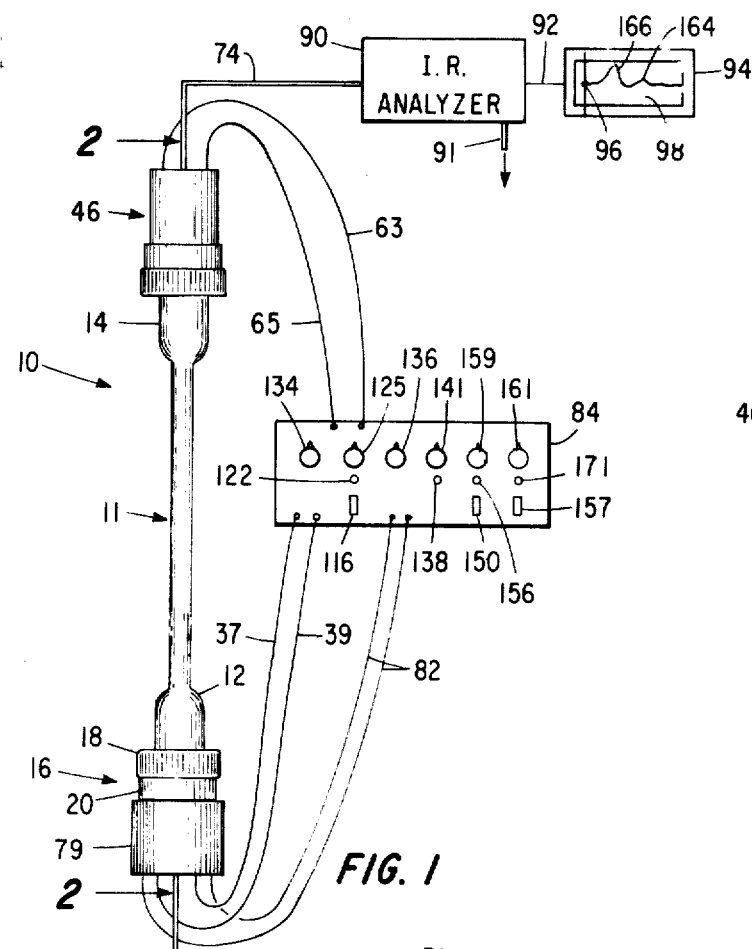
FIG. 1
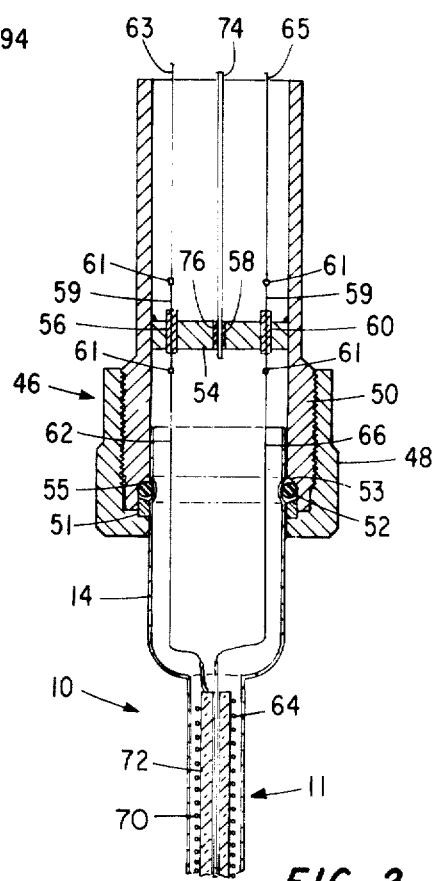
FIG. 2
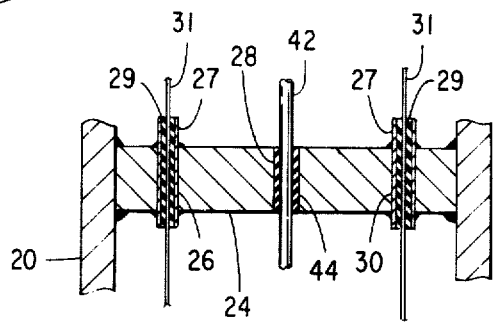
FIG. 6
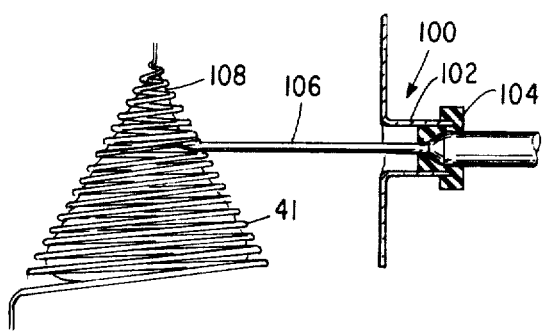
FIG. 3
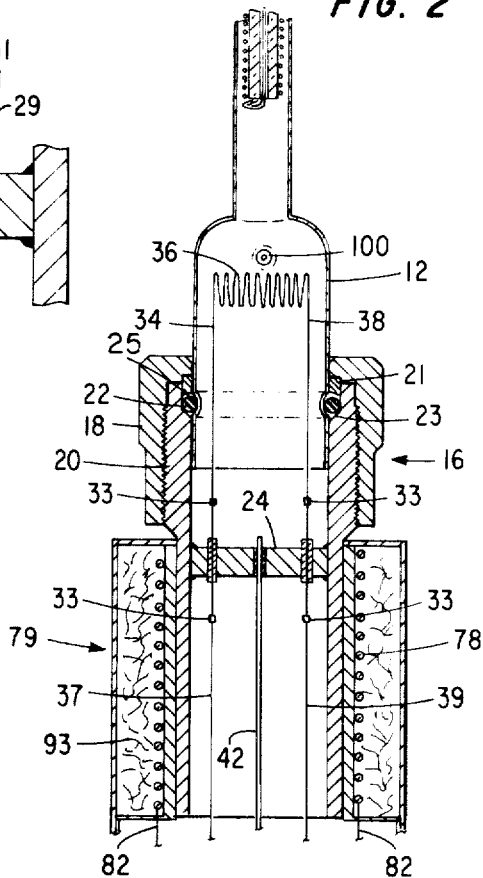

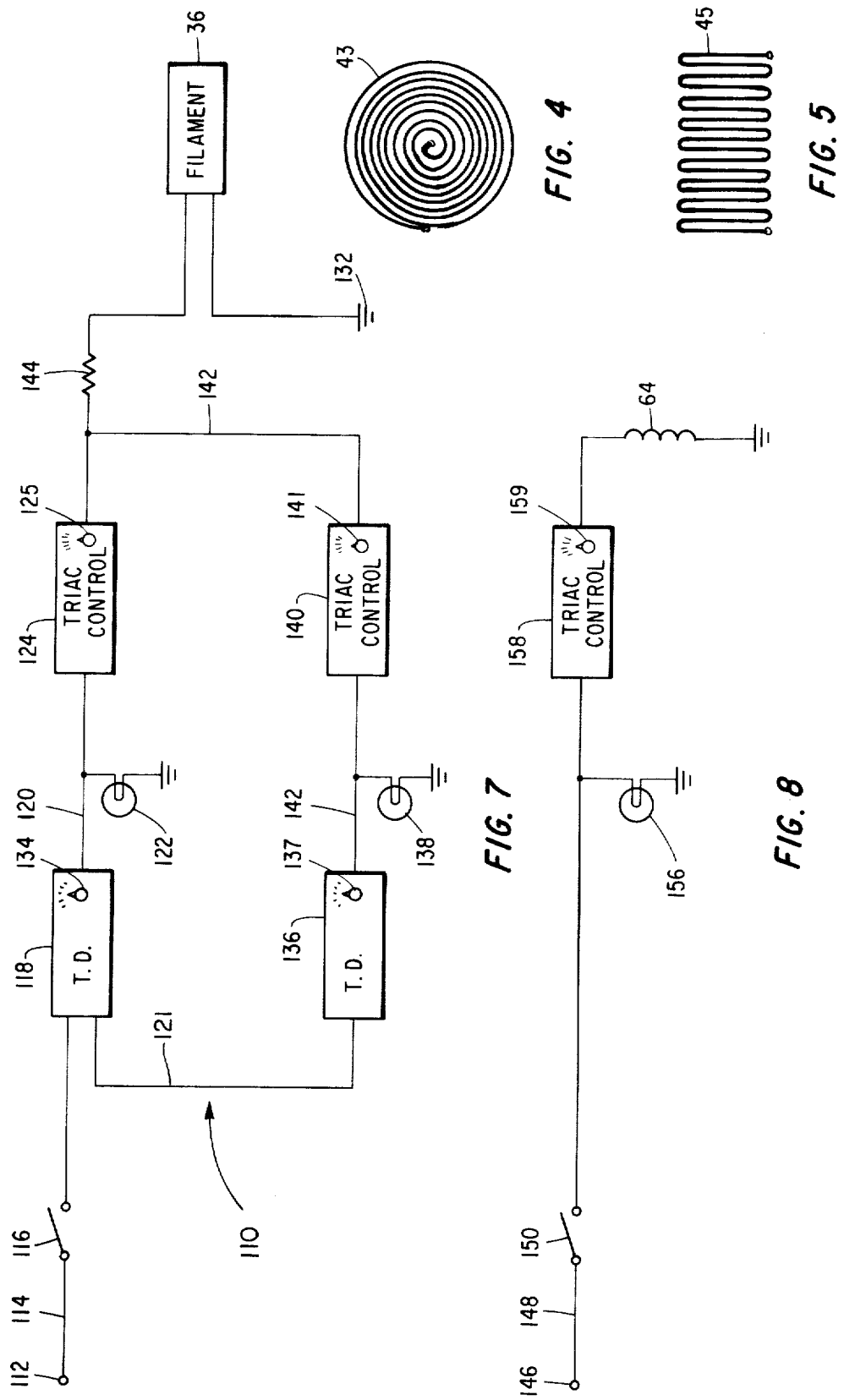

METHOD AND APPARATUS FOR VAPORIZING LIQUIDS TO BE CONTACTED WITH A CARRIER GAS

DESCRIPTION OF PRIOR ART

Some chemical analysis procedures involve the vaporization of a liquid containing chemical substances to permit reaction of the chemical substances with a carrier gas which is contacted with the vaporized chemical substances within the confines of a reaction chamber. For example, in the determination of the carbon content of a liquid, such as water, one method involves injecting a quantity of the water solution into a chamber through which is passing a carrier gas, such as oxygen. The water is vaporized, in some instances in the presence of a gas-permeable diffusing plug in the reaction chamber, to permit reaction between the chemical substances containing carbon and the oxygen to produce carbon dioxide which is then detected in the outlet gases from the reaction chamber by means of an instrument such as an infrared analyzer sensitized for carbon dioxide. Apparatus of the type described above are described and illustrated in U.S. Pat. No. 3,296,435 for "Method and Apparatus for Determining the Total Carbon Content of Aqueous Systems" and U.S Pat. No. 3,459,938 for "Method and Apparatus for Determining the Inorganic Carbon Content in a Liquid". These apparatus have several disadvantages among which are that the gas-permeable diffusing plug in the reaction chamber can become fouled with metals and inorganic salts thus lowering their permeability and diminishing the effectiveness of the apparatus. Also, as the reaction chambers are normally maintained at temperatures sufficient to cause reaction between the chemical substances and the carrier gas the liquid containing chemical substances will almost instantaneously vaporize upon being admitted to the reaction chamber causing pressure surges which can force small amounts of the sample to pass through the chamber without sufficient reaction time thus lowering the accuracy of the instrument. Also, heat is normally applied to these reaction chambers externally of the chamber and the high temperatures which are sometimes employed can cause "alloying" of metal salts, such as sodium chloride, with silica reaction chambers which are often employed.

The devices discussed above do not readily admit to determination of the quantity of both the volatile chemical substances present and nonvolatile chemical substances present as both are reacted substantially simultaneously. One device that has been proposed for determining the quantity of volatile chemical substances and nonvolatile chemical substances is utilized by discharging a liquid containing the substances into a small tray which is mechanically moved first through a low temperature zone to vaporize the volatile substances and then into a high temperature zone to permit reaction of the nonvolatile substances and the carrier gas. However, such a device suffers the disadvantage of being relatively complicated to construct and difficult to disassembly for cleaning and maintenance.

The use of two temperatures in analytical techniques is also known. In metal detection a liquid solution containing metals, normally in the form of a salt, can be volatilized by placing the liquid on a recess in a high melting point metal ribbon. The ribbon is then heated to vaporize the solvent. Subsequently, it is raised to a higher temperature to excite the metals into a higher energy state to permit detection of the metals by spectroanalysis.

The present invention provides a method and apparatus which may be simply constructed and readily employed to determine the quantity of volatile and nonvolatile chemical substances in a liquid.

SUMMARY OF THE INVENTION

The method of the present invention may be generally described as an improvement in the method of evaporating a liquid in a chamber through which flows a carrier gas to permit contact of the vaporized liquid with the carrier gas. The liquid to be vaporized is introduced onto a filament so formed as to retain the liquid thereon by capillary action, and a voltage is impressed across the filament to raise the temperature of the liquid sufficiently to vaporize the liquid.

The invention is also characterized by apparatus including a reaction chamber within which a liquid is to be vaporized to permit contact of the vaporized liquid with a carrier gas flowing through the chamber. The invention is characterized by an improvement in such apparatus which comprises a current conductive filament positioned within the chamber and so formed as to retain a liquid thereon by capillary action, and a voltage regulating means for impressing a first voltage across said filament for vaporizing any liquid thereon. The current regulating means may also typically, after impressing a first voltage for a desired and predetermined period of time across the first filament, impress a second voltage of a greater magnitude across the filament.

BRIEF DESCRIPTION OF THE DRAWINGS

FIG. 1 is an elevational view, partly in schematic form, of an embodiment of the present invention;

FIG. 2 is a cross-sectional view along line 2—2 of FIG. 1;

FIG. 3 is an enlarged elevational view of a filament and a portion of a reaction chamber;

FIGS. 4 and 5 are top plan views of alternative forms of filaments;

FIG. 6 is an enlarged elevational view, in section, of a portion of the unit shown in FIGS. 1 and 2; and FIGS. 7 and 8 are schematic representations of electrical circuits.

DESCRIPTION OF THE PREFERRED EMBODIMENT

Various chemical analysis techniques involve the evaporation of a liquid containing chemical substances in order to permit contact of the vapor with a gas. For example, in the determination of carbon content in a liquid such as water it is conventional to evaporate or vaporize the water and any volatile carbon-containing compounds in the water in the presence of oxygen at a high temperature to permit reaction between the carbon and the oxygen to form carbon dioxide. The carbon dioxide may then be detected by a conventional infrared analyzer sensitized for carbon dioxide analysis. Construction of such analyzers and their operation are described in U.S. Pat. Nos. 2,698,390; 2,681,415; and 2,709,751. The illustrated embodiment of the present invention is particularly suited to determination of carbon content in water samples and reference is here made to the drawings which illustrate the preferred embodiment of the present invention. With reference to FIGS. 1 and 2, the preferred embodiment includes a reaction unit 10 having an elongated tube 11 with enlarged ends 12 and 14. Tube 11 is preferably constructed of quartz although other materials may be employed. End 12 of tube 11 is received within a metal housing 16 formed by an internally threaded cap 18 and externally threaded sleeve 20 which when threadably engaged serve to compress a silicone rubber ring 22 between metal ring 21 and beveled surface 23. The ring will expand, when compressed into recess 25 in tube 11 to form a gas-tight seal therewith. Sleeve 20 carries a transversely disposed cylindrical partition 24 having apertures 26, 28 and 30 therethrough. Passing through apertures 26 and 28 and affixed therein are metal sleeves 27 fitted with silicone rubber sleeves 29. Both rubber sleeves 29 sealingly surround metal, current-conductive pins 31 which have coupling elements 33 on each end. Coupling elements 33 above partition 24 receive leads 34 and 38 of horizontally disposed, wound, current-conductive filament 36. The remaining couplings 33 receive electrical conductors 37 and 39. Disposed through aperture 28 is a metal conduit 42 which is sealingly retained within partition 24 by a silicone rubber plug 44. The opposite end 14 of tube 11 is similarly received within a metal housing 46 having an internally threaded cap 48 and externally threaded sleeve 50 which, when threadably engaged, serve to compress a silicone rubber ring 52 between metal ring 51 and beveled surface 53. Ring 52 when compressed will expand into recess 55 in tube 11 to form a gas-tight seal therewith. The sleeve 50 is provided with a transversely disposed cylindrical partition 54 having apertures 56, 58 and 60. Partition 54 is identical to partition 24 shown in FIG. 6. The metal, current-conductive pins 59 through bottom coupling elements 61 receive leads 62 and 66 of coiled current-conductive filament 64. The coiled filament 64 extends downwardly through tube 11 along the longitudinal axis thereof and lead 66 thereof passes inwardly of the coiled portion 70 and has an insulating layer 72 disposed therearound to prevent electrical shorting between the lead 66 and coiled portion 70 of filament 64. The remaining coupling elements 61 are attached to electrical conductors 63 and 65. Partition 54 through its centrally disposed aperture 58 receives a metal conduit 74 which is sealingly retained within aperture 58 by silicone rubber plug 76. Externally disposed around the enlarged end 12 of metal housing 16 is a muffle heater 79 having an internal high resistance filament 78 and an insulating material 93. Filament 78 has leads 82 which are connected to power housing 84. Similarly, the cylindrical filament 36 has its leads 37 and 39 connected to power housing 84 while the elongated filament 64 has its leads 63 and 65 also connected to power housing 84. The bottom conduit 42 is in communication with a source of pure oxygen indicated schematically as block 88 while the oppositely disposed conduit 74 is in communication with an infrared analyzer 90 of conventional design. The infrared analyzer 90 has an exhaust gas outlet 91 and an electrical output through conductor 92 to a strip chart recorder 94 of conventional design. Recorder 94 by means of a stylus 96 records the voltage changes in conductor 92 on chart 98 in a conventional manner. A voltage or digital integrator could also be employed to record the output of analyzer 90.

To permit charging of a sample to tube 11, tube 11 has a liquid injection port 100 which comprises a sleeve 102 which is sealed by a silicone rubber septum 104. The sleeve 102 and associated structure are shown in more detail in FIG. 3, which also illustrates an alternative form of filament. The septum 104 is adapted to receive a needle 106, such as the type commonly employed with hypodermic syringes for discharging a liquid 108 onto filament 36 or conical filament 41 where it will be retained by capillary action. The filament may be cylindrical in shape as illustrated in FIG. 2, conical as illustrated in FIG. 3, take the form of a flat spiral 43 or serpentine shape 45 as illustrated in FIGS. 4 and 5, respectively.

Voltage applied to filaments 36, 64 and 78 are controlled through electrical circuitry in power housing 84 which is more particularly illustrated in FIG. 7. With reference to FIG. 7, the voltage for filament 36 is regulated by a circuit 110 which derives through terminal 112 power from a conventional 110 volt, 60 Hertz outlet. Virtually any AC power supply will suffice with proper circuit components to supply voltage to the filament. Terminal 112 is connected through a conductor 114 with a manually operable switch 116 which, when closed, supplies voltage to time delay circuit 118. The time delay circuit 118 is normally closed to permit application of voltage through conductor 120 to filament 122 and Triac control circuit 124. The Triac control circuit 124 applies voltage through a resistor 144 to filament 36 and includes a rheostat control knob 125 for adjusting the output voltage of the circuit. The time during which Triac control 124 permits current flow through filament 36 to ground 132 is adjustable by operation of rheostat control knob 134 of time delay circuit 118. By operation of knob 134 the time delay circuit 118 will energize Triac 124 for a period from 0 to 180 seconds, for example. After timing out of time delay circuit 118 voltage will be applied through conductor 121 to time delay circuit 136 and the circuit to conductor 120 opened to discontinue power to Triac control 124. Voltage supplied through conductor 121 to normally closed time delay circuit 136 will energize filament 138 and Triac control 140 through conductor 142. Time delay circuit 136 includes a rheostat control operated by knob 137 which can permit regulation of the period of power application to Triac control 140 from 0 to 30 seconds, for example. Triac control 140 will then through conductor 142 and resistor 144 apply a high voltage to filament 36. The output of Triac control circuit 140 is adjustable by operation of rheostat control knob 141. Filament 64 is controlled by the voltage regulating means which is schematically illustrated in FIG. 5. Terminal 146 of the circuit derives a 110 volt, 60 Hertz signal from a conventional source and through conductor 148 and normally opened switch 150 will supply such signal to Triac control circuit 158 the output of which may be varied by operation of rheostat control knob 159. The circuits which service filaments 64 and 78 are identical except the voltage output of the Triac control for filament 78 is set to deliver a lower level of voltage than is the Triac control 158 for filament 64. With reference to FIG. 1, voltage application to filament 64 and 78 may be controlled by switches 150 and 157 and control knobs 159 and 161 which control Triac control circuit 158 and a corresponding Triac control circuit. Filaments 156 and 171 indicate when switches 150 and 157 have been closed.

In operation, the unit 10 is brought to an equilibrium condition by closing of switches 150 and 157 which impress a voltage across filaments 64 and 78 to raise the temperature within chamber 11 adjacent the enlarged end 12 to approximately 90°–110°C. and the temperature within the chamber adjacent filament 64 to approximately 850°C. Oxygen is then admitted from the oxygen source 88 to the tube 11 to flush impurities from tube 11 until the strip chart recorder 94 indicates an equilibrium condition has been reached with no carbon dioxide present or a constant small amount being present due to bleed off from components of the systems. Next, a liquid sample which is believed to contain volatile and/or nonvolatile carbon-containing compounds is admitted to chamber 11 by introducing a hypodermic needle 106 through septum 102 and discharging the liquid sample onto filament 36. Switch 116 is then closed to permit voltage from Triac control 124 to be impressed across the filament 36 elevating its temperature to a first voltage level which has been predetermined to be sufficient to raise the temperature of the liquid contained within filament 36 to a temperature slightly above its vaporization temperature, for example, 105°C. After a predetermined period of time which is determined by control of rheostat knob 134, which period of time is sufficient to vaporize the liquid sample 108, the circuit to Triac control 124 will open causing Triac control 140 to then impress a higher voltage across filament 36 to raise the temperature of filament 36 to a second predetermined level, for example, 900°C. During the initial low voltage state the filament 36 will cause vaporization of the volatile carbon compounds and water. The oxygen admitted through conduit 42 will sweep these volatilized and vaporized gases into the reduced diameter portion of tube 11 where they will contact filament 64 which is maintained, as stated before, at a temperature of approximately 850°C. At this temperature there will be a reaction between the oxygen and carbon compounds to produce carbon dioxide which is then swept out of the system along with unreacted gaseous components through conduit 74 to infrared analyzer 90 where the presence of the carbon dioxide will be detected and a signal generated in conductor 92 to drive stylus 96 on strip chart recorder 94. The gases after passing through infrared analyzer will exit through exhaust conduit 91.

The carbon dioxide content of the volatile carbon-containing compounds will be reflected on strip chart 98 as a first curve 164. Subsequently, the high temperature condition of filament 36 will cause reaction between nonvolatile carbon compounds which are retained on filament 36 and oxygen admitted through conduit 42. These gaseous by-products including carbon dioxide will be swept through the reduced diameter portion of the tube 11 where they contact filament 64 to further insure complete combustion. The carbon dioxide and other gaseous products will exit the reaction chamber 10 through conduit 74 and pass through analyzer 90 where, if carbon dioxide is present, a signal will be generated in conductor 92 driving stylus 96 to form a second curve, such as curve 166 on strip chart 98. The gases will exit infrared analyzer 92 through conduit 91.

While the particular embodiment illustrated is particularly useful in determination of carbon content of water samples, it may be employed with slight modification to permit determination of sulfur content of a liquid, for example, by using hydrogen as the carrier gas and reacting the hydrogen with the sulfur in the liquid to produce hydrogen sulfide which is then passed through a suitable detector sensitized for hydrogen sulfide. The unit may also be used to determine organic nitrogen by utilizing the present invention to determine total nitrogen and conventional techniques to determine inorganic nitrogen. Organic nitrogen may than be determined by subtracting the inorganic nitrogen quantity from total nitrogen. It will be also useful in determination of metal contents by converting the metals in the reaction unit 10 into their volatile derivatives, such as metal chlorides which can be formed by passing chlorine gas through the reaction unit 10 to react with the metals to form gaseous chlorides which then may be detected by suitable detectors. It can also be used for determining the total oxygen demand of a sample by reacting the liquid sample with oxygen as a carrier gas and determining the quantity of oxygen in the gaseous by-products. Knowing the quanity of oxygen metered to the reactor unit 10 permits determination of the oxygen demand of the sample.

One of the advantageous features of the present invention is that the liquid sample to be volatilized will not be volatilized instantaneously thus causing great pressure surges as the temperature of filament 36 is first elevated to a lower temperature, preferably slightly above the volatilization temperature of the liquid causing a controlled volatilization of the liquid. Further, the filament 36 may be elevated to a second temperature level to "burn off" nonvolatile chemical compounds thus permitting determination of both volatile and nonvolative chemical compound quantities. The temperatures of the filaments and time durations at which the filaments are maintained at desired temperatures may be varied considerably depending upon the types of analyses which are to be made and the types of chemical compounds to be charged to the reaction unit 10 and formed within the unit 10.

The filaments are extremely effective in heating liquids and in exposing nonvolatile substances for reaction because of the rather large surface area which will be in contact with the liquid before vaporization and with the gas thereafter. The capillary action causes the fluid to spread over the surface of the filament insuring efficient heat transfer between the filament and the liquid. If the filaments become contaminated they may be easily replaced by disengaging them from the couplings and inserting a new filament.

While a particular embodiment has been described and illustrated, other embodiments of the invention will become apparent to those skilled in the art after examination of the present application, and the invention is not to be limited to the specific embodiment shown, but is more particularly defined in the following claims.

What is claimed is:

1. In an apparatus having a reaction chamber within which a liquid is to be heated to permit reaction of a carrier gas admitted to the chamber through an inlet therein with chemical substances, the liquid to form gaseous reaction products which are discharged through an outlet in the chamber, the improvement which comprises:

a reaction chamber having an injection port through which a liquid may be admitted to the chamber near the inlet thereof;

a first current conductive filament positioned within said chamber near the inlet of the chamber and so positioned within the chamber that liquid admitted through the injection port may be discharged onto the filament, the filament being formed to retain the liquid thereon by capillary action;

first voltage regulating means for impressing a voltage of a desired magnitude across said first filament to vaporize the liquid retained on the filament to permit the vaporized liquid to be entrained in the carrier gas;

a second current conductive filament positioned in said chamber between the first filament and the outlet of the chamber; and second voltage regulating means for impressing a voltage across said second filament sufficient to cause a reaction between the vaporized liquid and the carrier gas.

2. In a method of reacting chemical substances in a liquid with a carrier gas by injecting the liquid into a chamber through which the gas flows and heating the liquid in the chamber to a sufficient temperature to cause reaction between the chemical substances and the carrier gas, the improvement which comprises:

injecting the liquid into the chamber onto a first current conductive filament so formed that it will retain the liquid thereon by capillary action;

impressing a voltage across the first filament to raise the temperature of the filament to a relatively low temperature to prevent substantially instantaneous volatilization of the liquid retained on the filament;

directing the carrier gas over said first filament to permit it to entrain the volatilized liquid and carry it over a second filament contained within the chamber;

impressing a voltage across the second filament to raise the temperature sufficiently to cause reaction between substances in the volatilized liquid and the carrier gas; and discharging the unreacted components and by-products of the reaction from the chamber.

3. The method of claim 2 including the steps of elevating the temperature of the first filament following volatilization of the liquid to a sufficient temperature to permit reaction between nonvolatile substances remaining on the first filament and the carrier gas; and discharging the by-products of the reaction from the chamber.

* * * * *